(12) United States Patent
Ohmori et al.

(10) Patent No.: US 10,095,080 B2
(45) Date of Patent: Oct. 9, 2018

(54) OPTICAL MODULATOR AND OPTICAL MODULE

(71) Applicant: Fujitsu Optical Components Limited, Kawasaki-shi, Kanagawa (JP)

(72) Inventors: Yasuhiro Ohmori, Sapporo (JP); Yoshinobu Kubota, Yokohama (JP); Masaharu Doi, Sapporo (JP); Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/650,222

(22) Filed: Jul. 14, 2017

(65) Prior Publication Data

US 2018/0031945 A1 Feb. 1, 2018

(30) Foreign Application Priority Data

Aug. 1, 2016 (JP) ................................. 2016-151501

(51) Int. Cl.
| | |
|---|---|
| *G02B 6/26* | (2006.01) |
| *G02F 1/225* | (2006.01) |
| *H04B 10/50* | (2013.01) |
| *G02F 1/00* | (2006.01) |
| *G02F 1/01* | (2006.01) |

(52) U.S. Cl.
CPC .......... *G02F 1/2255* (2013.01); *G02F 1/0027* (2013.01); *G02F 1/0123* (2013.01); *G02F 1/2257* (2013.01); *H04B 10/50572* (2013.01); *G02F 2201/07* (2013.01); *G02F 2203/21* (2013.01)

(58) Field of Classification Search
None
See application file for complete search history.

(56) References Cited

U.S. PATENT DOCUMENTS

| | | | |
|---|---|---|---|
| 2007/0081766 A1 | 4/2007 | Aoki et al. | |
| 2008/0193074 A1 | 8/2008 | Sugiyama | |
| 2012/0087614 A1* | 4/2012 | Ishimura | ............... G02F 1/2255 385/2 |
| 2013/0071059 A1* | 3/2013 | Motoya | ................. G02F 1/2255 385/3 |

(Continued)

FOREIGN PATENT DOCUMENTS

WO WO 2005/111703 A1 11/2005

*Primary Examiner* — Sung Pak
(74) *Attorney, Agent, or Firm* — Staas & Halsey LLP

(57) ABSTRACT

An optical modulator includes an optical modulator chip configured to optically modulate an optical signal using an electrical signal input thereto; and a relay substrate configured to relay and couple the electrical signal to the optical modulator chip. The optical modulator chip includes a signal electrode and a ground electrode for the electrical signal, formed along a waveguide for the optical signal. One end of the optical modulator chip is arranged to face the relay substrate. An electrode connection portion coupling the electrical signal to the relay substrate by wire is provided at the one end. A distance between a tip of one end of the signal electrode in the electrode connection portion and the end of the optical modulator chip is less than a distance between a tip of an end of the ground electrode in the electrode connection portion and the end of the optical modulator chip.

12 Claims, 20 Drawing Sheets

(56) References Cited

U.S. PATENT DOCUMENTS

| | | | | |
|---|---|---|---|---|
| 2014/0119686 A1* | 5/2014 | Sugiyama | ............ | G02F 1/2255 385/2 |
| 2014/0119745 A1* | 5/2014 | Sugiyama | ............ | G02F 1/2255 398/188 |
| 2015/0078763 A1* | 3/2015 | Sugiyama | ............... | G02F 1/225 398/200 |
| 2015/0293427 A1* | 10/2015 | Goi | ........................ | G02F 1/025 385/3 |
| 2016/0011486 A1* | 1/2016 | Sugiyama | ................. | G02F 1/21 398/188 |
| 2016/0313503 A1* | 10/2016 | Takemura | ............ | G02F 1/0316 |

* cited by examiner

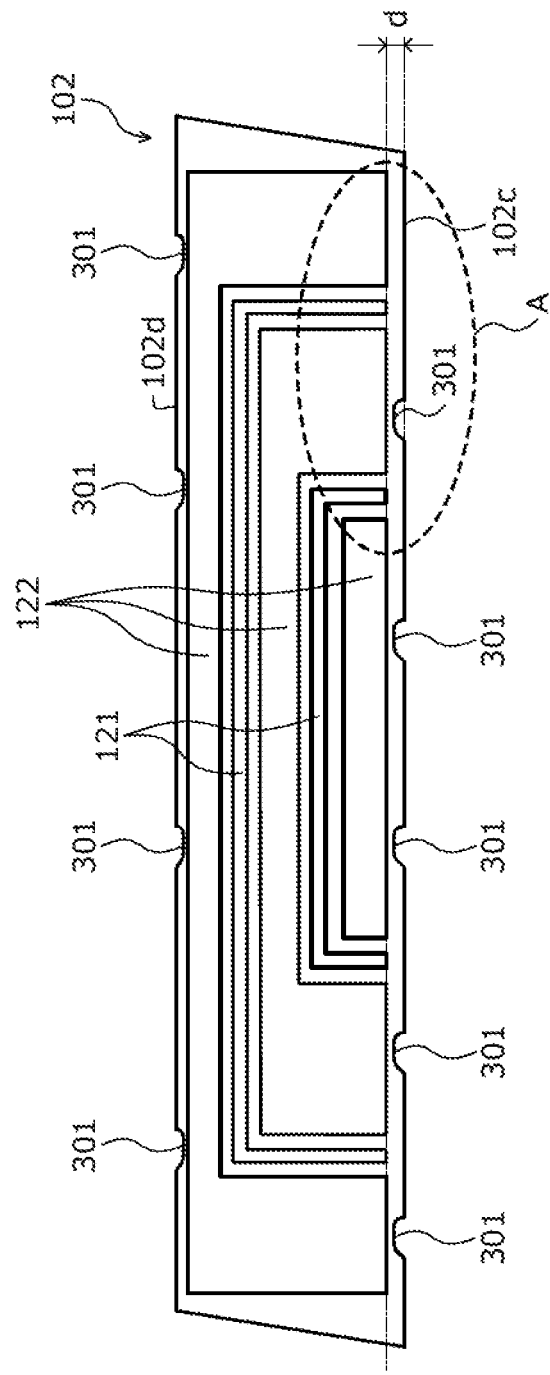

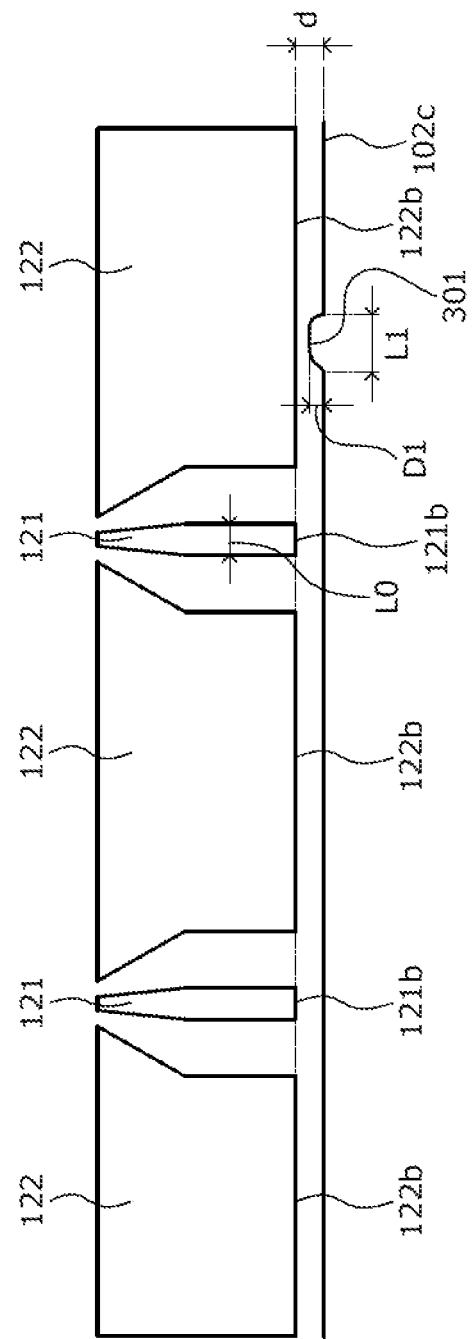

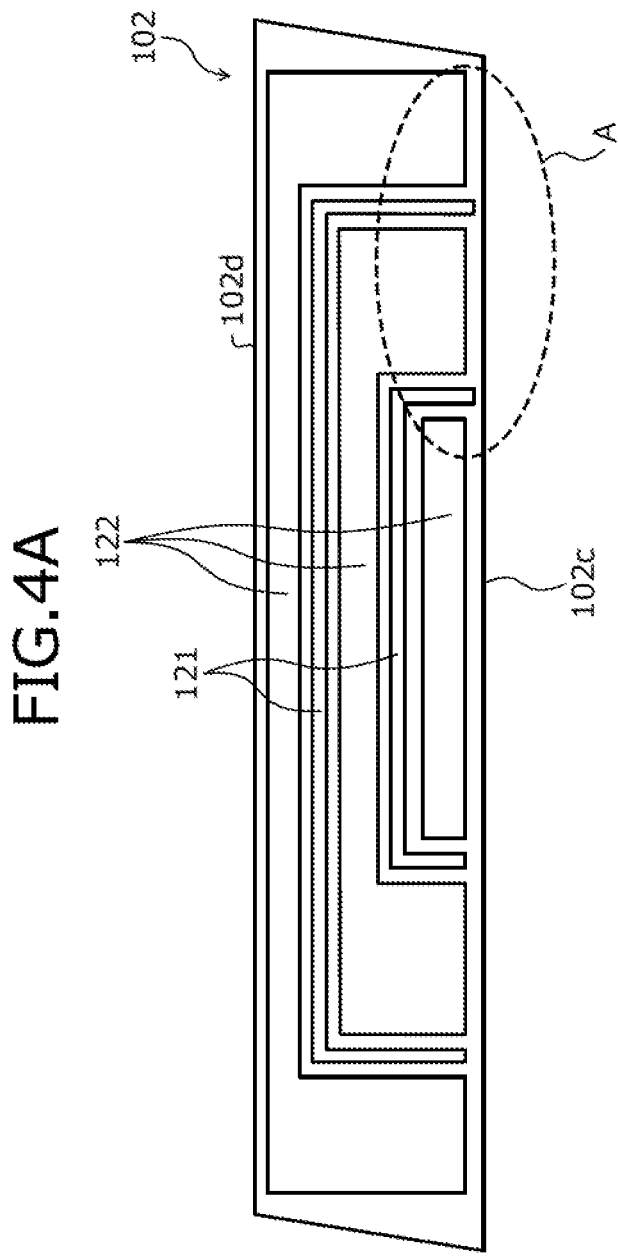

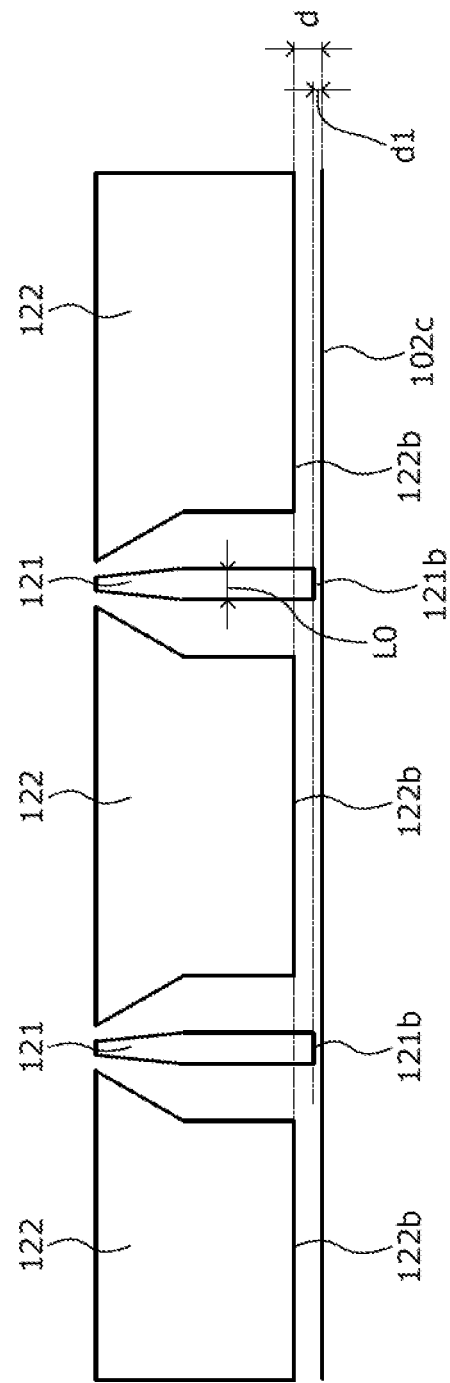

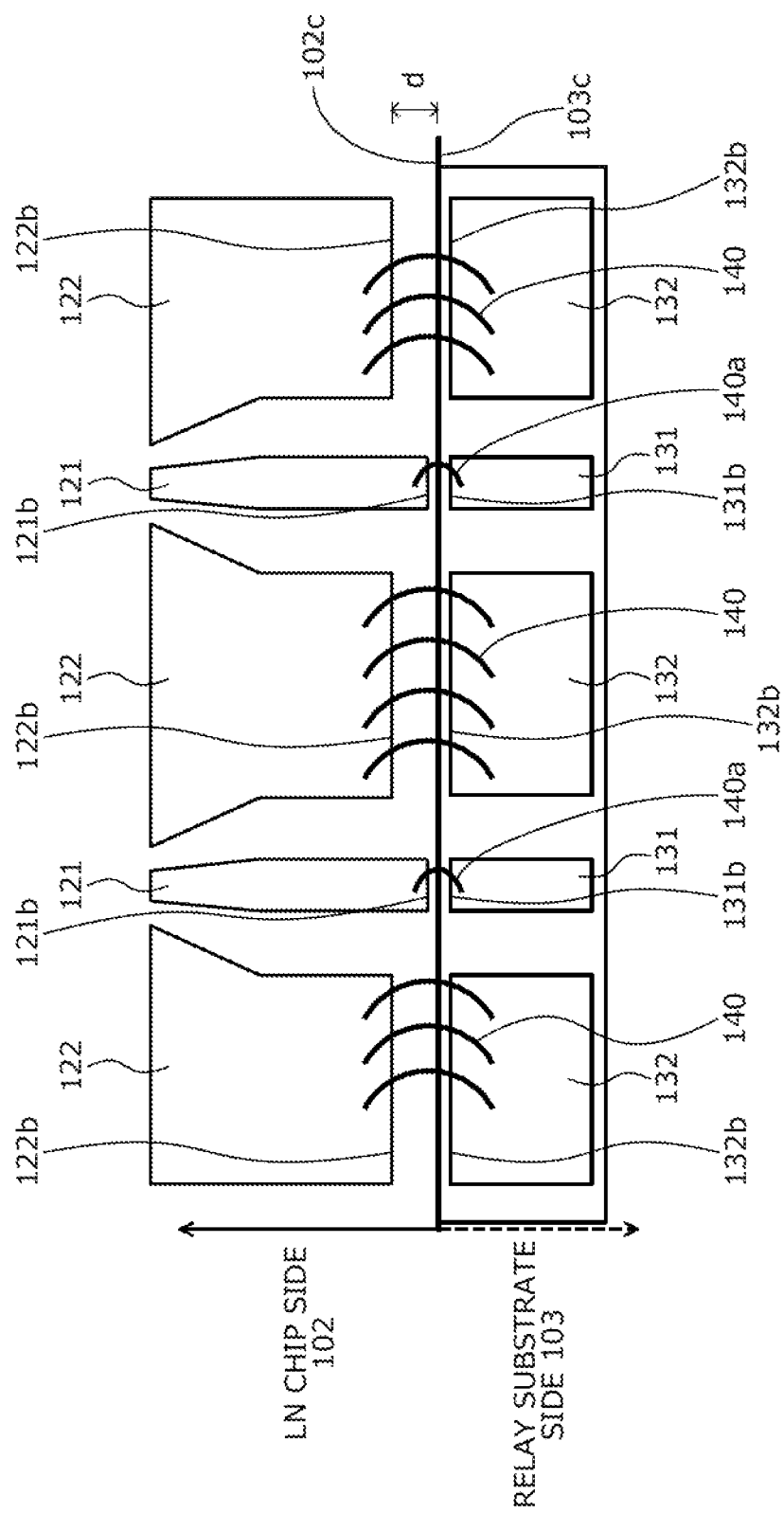

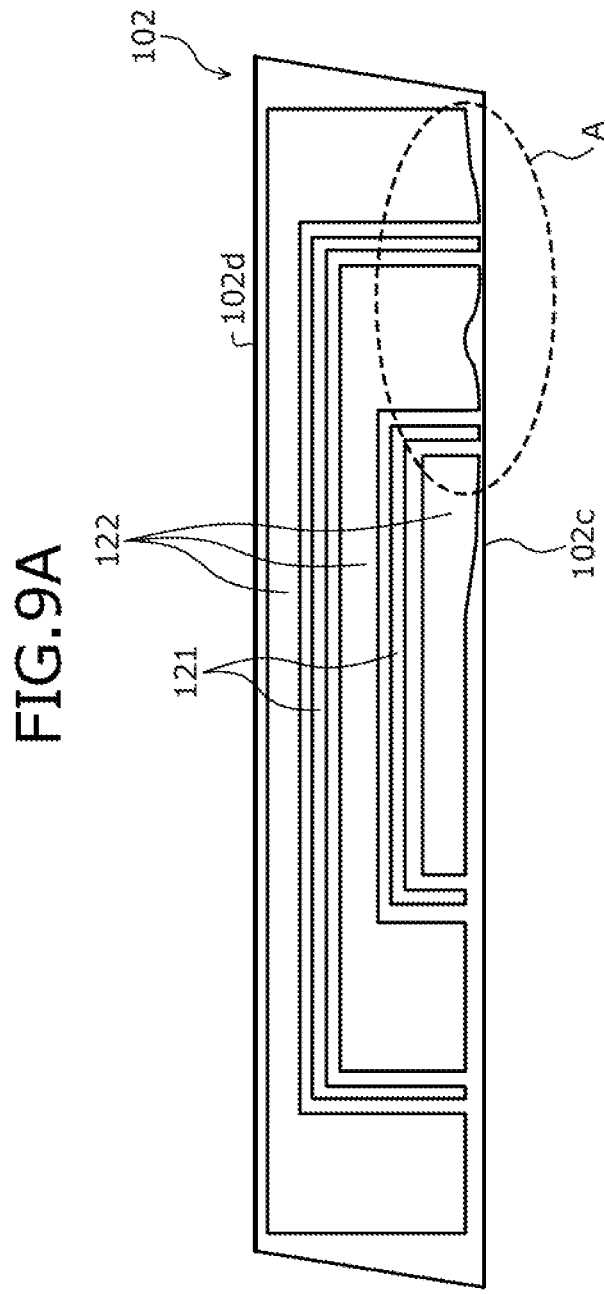

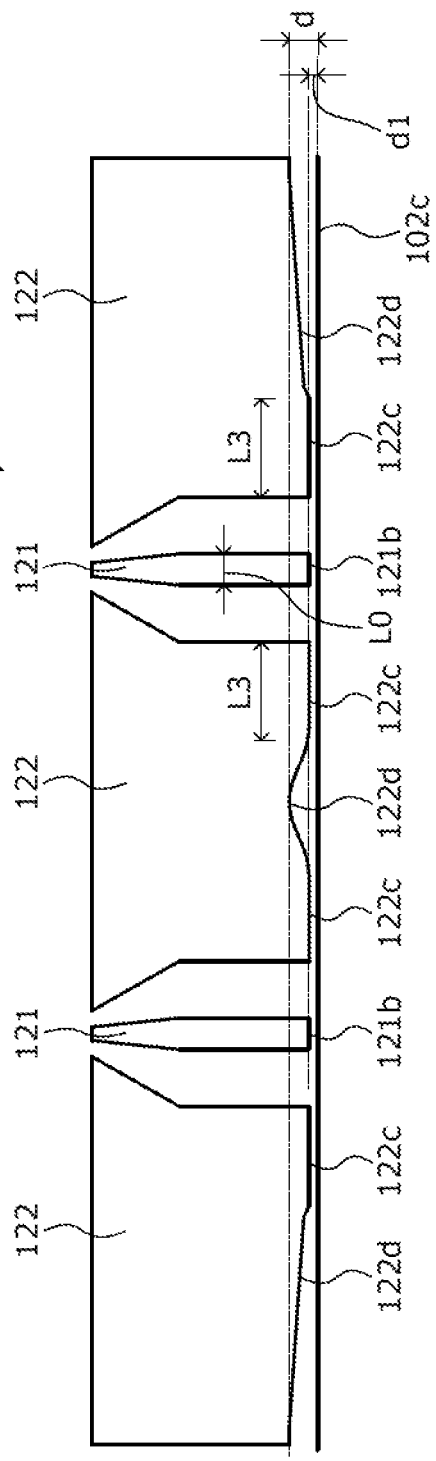

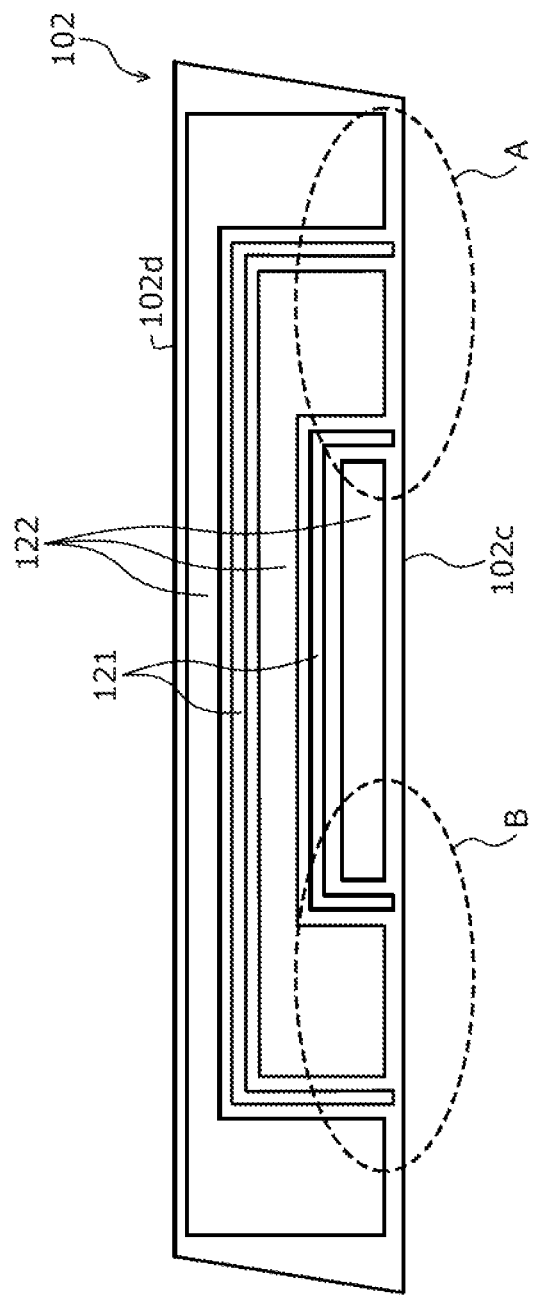

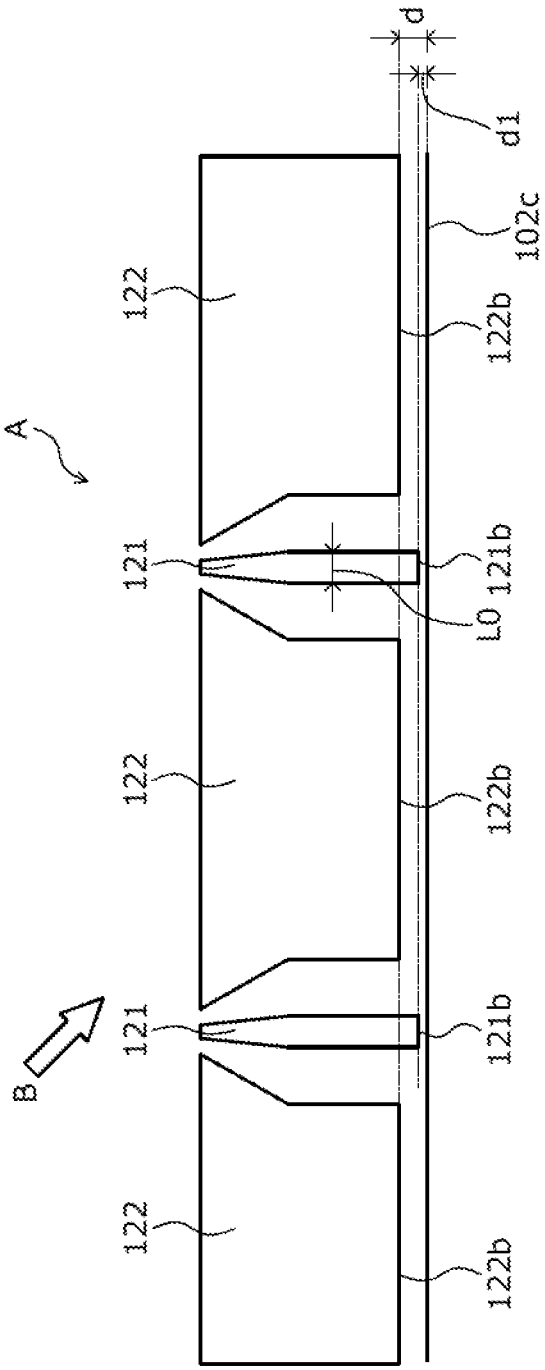

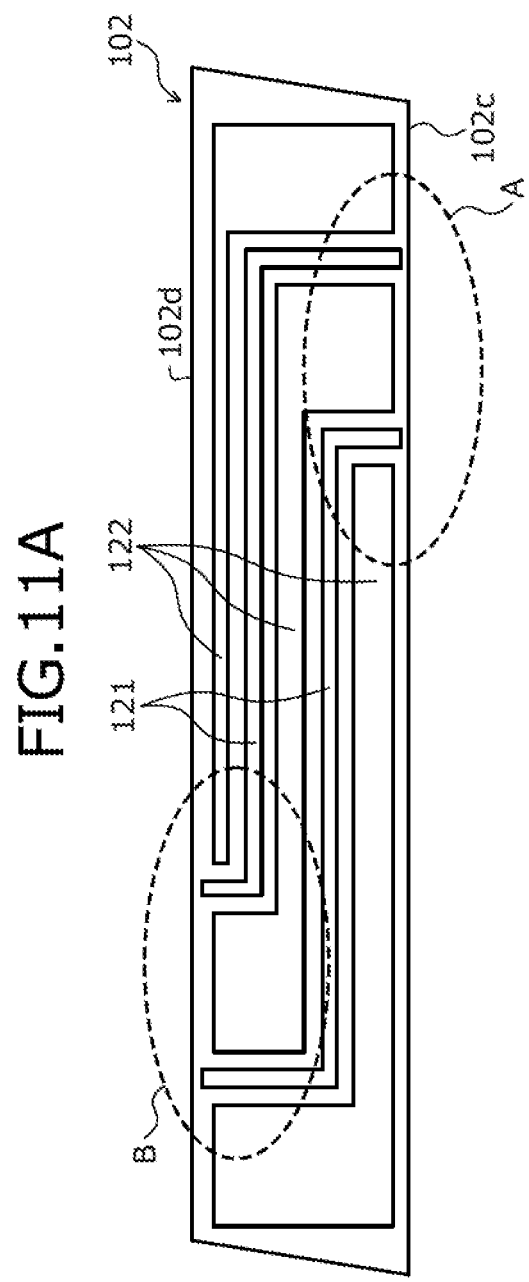

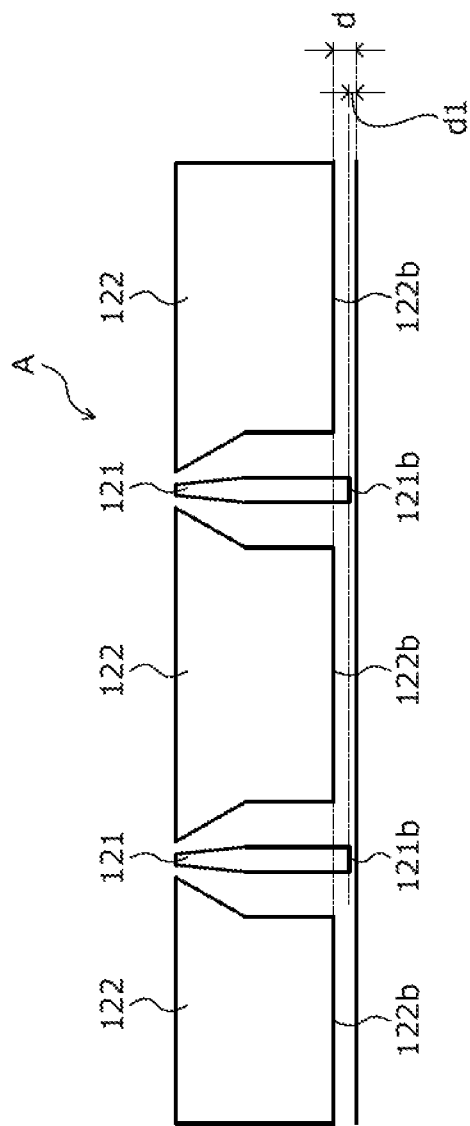

OPTICAL MODULATOR AND OPTICAL MODULE

CROSS REFERENCE TO RELATED APPLICATIONS

This application is based upon and claims the benefit of priority of the prior Japanese Patent Application No. 2016-151501, filed on Aug. 1, 2016, the entire contents of which are incorporated herein by reference.

BACKGROUND OF THE INVENTION

1. Field of the Invention

Embodiments of the invention relate to an optical modulator and an optical module.

2. Description of the Related Art

Recently in the optical communication field, to cope with rapidly increasing traffic, the shift to higher bands such 100 G or 400 G [bits/sec] has advanced and devices used therein such as an optical modulator are also demanded to support the higher bands. Among wideband optical modulators are those in which $LiNbO_3$, InP, or Si is used in the substrate (a chip). Of these, optical modulators in which $LiNbO_3$ (hereinafter, referred to as "LN") is used in the chip are used as a main component in respects of insertion loss, transmission characteristics, and the controllability.

According to a conventional technique, for example, improvement of the ripple of the high-pass characteristics is facilitated by forming a first gap between a first ground electrode and a signal electrode and forming a second gap between a second ground electrode and the signal electrode (for example, refer to WO 2005/111703). According to another conventional technology, the thickness of an end portion of a signal electrode is made thinner than the thickness of an electrode of an interaction portion (for example, refer to U.S. Patent Application Publication No. 2008/0193074).

SUMMARY OF THE INVENTION

According to one aspect of the present invention, an optical modulator includes an optical modulator chip configured to optically modulate an optical signal using an electrical signal input thereto; and a relay substrate configured to relay and couple the electrical signal to the optical modulator chip. The optical modulator chip includes a signal electrode and a ground electrode for the electrical signal, formed along a waveguide for the optical signal. One end of the optical modulator chip is arranged to face the relay substrate, and an electrode connection portion configured to couple the electrical signal to the relay substrate using a wire is provided at the one end. A distance between a tip of one end of the signal electrode positioned in the electrode connection portion and the end of the optical modulator chip is less than a distance between a tip of an end of the ground electrode positioned in the electrode connection portion and the end of the optical modulator chip.

Objects, features, and advantages of the present invention are specifically set forth in or will become apparent from the following detailed description of the invention when read in conjunction with the accompanying drawings.

BRIEF DESCRIPTION OF THE DRAWINGS

FIGS. 3A and 3B are explanatory plan diagrams of chippings generated in the existing optical modulator chip;

FIGS. 4A and 4B are plan diagrams of an optical modulator chip according to a first embodiment;

FIG. 5 is an enlarged view of FIG. 4A, depicting a state of the wire connection;

FIGS. 9A and 9B are plan diagrams of an optical modulator chip according to a third embodiment;

FIGS. 10A and 10B are plan diagrams of an optical modulator chip according to a fourth embodiment; and FIGS. 11A, 11B, and 11C are plan diagrams of an optical modulator chip according to a fifth embodiment.

DETAILED DESCRIPTION OF THE INVENTION

A configuration of an existing optical modulator chip, an optical modulator, and an optical module will be described. In the present invention, a LN chip will be described as an example of the optical modulator chip.

Figure 1:
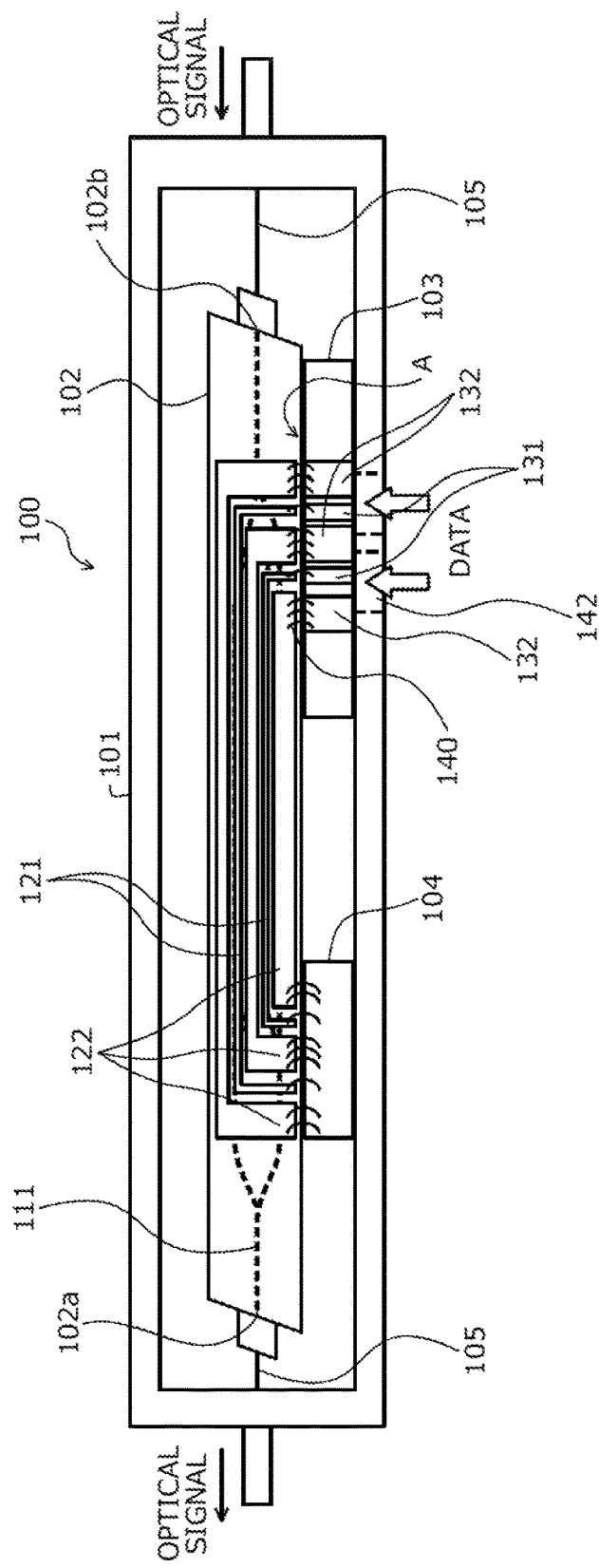
FIG. 1 is a plan diagram of an example of a configuration of an existing optical modulator.

FIG. 1 is a plan diagram of an example of the configuration of an existing optical modulator. The optical modulator 100 includes, inside a housing (a package) 101, an LN chip (an optical modulator chip) 102 including a substrate material that is a ferroelectric such as, for example, LN, a relay substrate 103 that relays and couples to the LN chip 102, an electrical signal input thereto from outside the package 101, parts 104 such as a terminating resistor and a bias T provided on the LN chip 102 portion in the terminating portion of the electrical signal, an optical fiber 105 for a light beam to enter or exit the LN chip 102, and the like. The optical modulator 100 is provided as a transmitting unit of the optical module.

The optical module includes a laser diode (LD), the optical modulator 100, an optical system such as a lens and the optical fiber that input and output an optical signal, a control unit that controls operations such as optical modulation, and the like. The optical module causes a light beam emitted by a light source to enter the optical modulator 100, optically modulates an electrical signal transmitted by the optical modulator 100, and outputs the optically modulated electrical signal to a transmission path such as the optical fiber. The optical module may further include a configuration on the reception side that receives an optical signal in the optical transmission path (such as, for example, a receiving unit and an optical demodulating unit). When the optical module includes the transmission side and the reception side, a control unit may further be provided therein that collectively controls the transmitting unit and the receiving unit.

The LN chip 102 is provided with an optical waveguide 111 (indicated by a dotted line in FIG. 1) that guides the light beam entering thereinto from the light source, from an entrance end 102a to an exit end 102b over a predetermined length, and the optical signal optically modulated in the optical waveguide 111 portion is output from the other end 102*b* toward the transmission path. The entrance end 102*a* and the exit end 102*b* are each obliquely cut and are each connected to the optical fiber 105 or the like. For connection of a lens system or the like, reflection reduction treatment such as AR coating is applied to the entrance end 102*a* and the exit end 102*b* portions of the optical waveguide 111 to reduce the reflectance of the light beam entering thereinto or exiting therefrom.

In the example of the configuration of FIG. 1, the optical waveguide 111 is branched into two along the length direction (the direction of travel of the light beam) and linear-shaped signal electrodes 121 are provided along the length direction of each of the branched optical waveguides 111. Ground electrodes (grounded electrodes) 122 each having a larger width than that of the signal electrode 121 are provided in the portions on both sides of the signal electrodes 121. The portion of the signal electrodes 121 (and the ground electrodes 122) provided along the optical waveguide 111 functions as an interacting unit for the optical modulation, data of an electrical signal to be transmitted is output to the signal electrode 121, and the interacting unit of the optical waveguide 111 thereby converts the electrical signal into an optical signal (optical modulation).

In the example of the configuration of FIG. 1, the relay substrate 103 is provided on one end (an electrode connection portion A) of the signal electrode 121 (and the ground electrode 122) of the LN chip 102. Although not depicted in FIG. 1, a terminating resistor is provided on the other end of the signal electrode 121 (and the ground electrode 122) of the LN chip 102.

The relay substrate 103 is arranged facing the signal electrode 121 and the ground electrode 122 portions of the LN chip 102. On the relay substrate 103, signal electrodes 131 connected to the signal electrodes 121 of the LN chip 102 and the ground electrodes 132 connected to the ground electrodes 122 of the LN chip 102 are provided. The end face of the LN chip 102 and the end face of the relay substrate 103 facing each other are each formed at the cutting step, and the LN chip 102 and the relay substrate 103 are arranged having respective end faces adhered to each other or having a predetermined gap therebetween.

The signal electrode 121 of the LN chip 102 and the signal electrode 131 of the relay substrate 103 are electrically connected to each other through a wire 140 set by wire bonding. The ground electrode 122 of the LN chip 102 is also electrically connected to the ground electrode 132 of the relay substrate 103 through wires 140. A plug connector (a connector) 142 is provided using solder or the like in a portion (the package 101 portion) on the side opposite to that of the electrode connection portion A of the relay substrate 103, and an electrical signal (data) is input through the connector 142 such as a coaxial cable or the like connected to the signal electrode 131, and the ground electrode 132 of the relay substrate 103.

Inside the package 101 of the optical modulator 100, components are additionally provided on the lower face of the LN chip 102 such as a temperature adjusting structure that includes a heat leveling board, a Peltier device, and the like; a temperature detector; a photo-receiver (PD) that detects the power of an optical signal; and the like. The control unit executes various types of control for inputting of an electrical signal (data), oscillating light beam of the light source, and the optical modulator (the bias current and the like). In addition, the control unit executes control for a constant temperature by controlling the temperature adjusting structure based on the temperature detected by the temperature detector, and the like.

Figure 2:
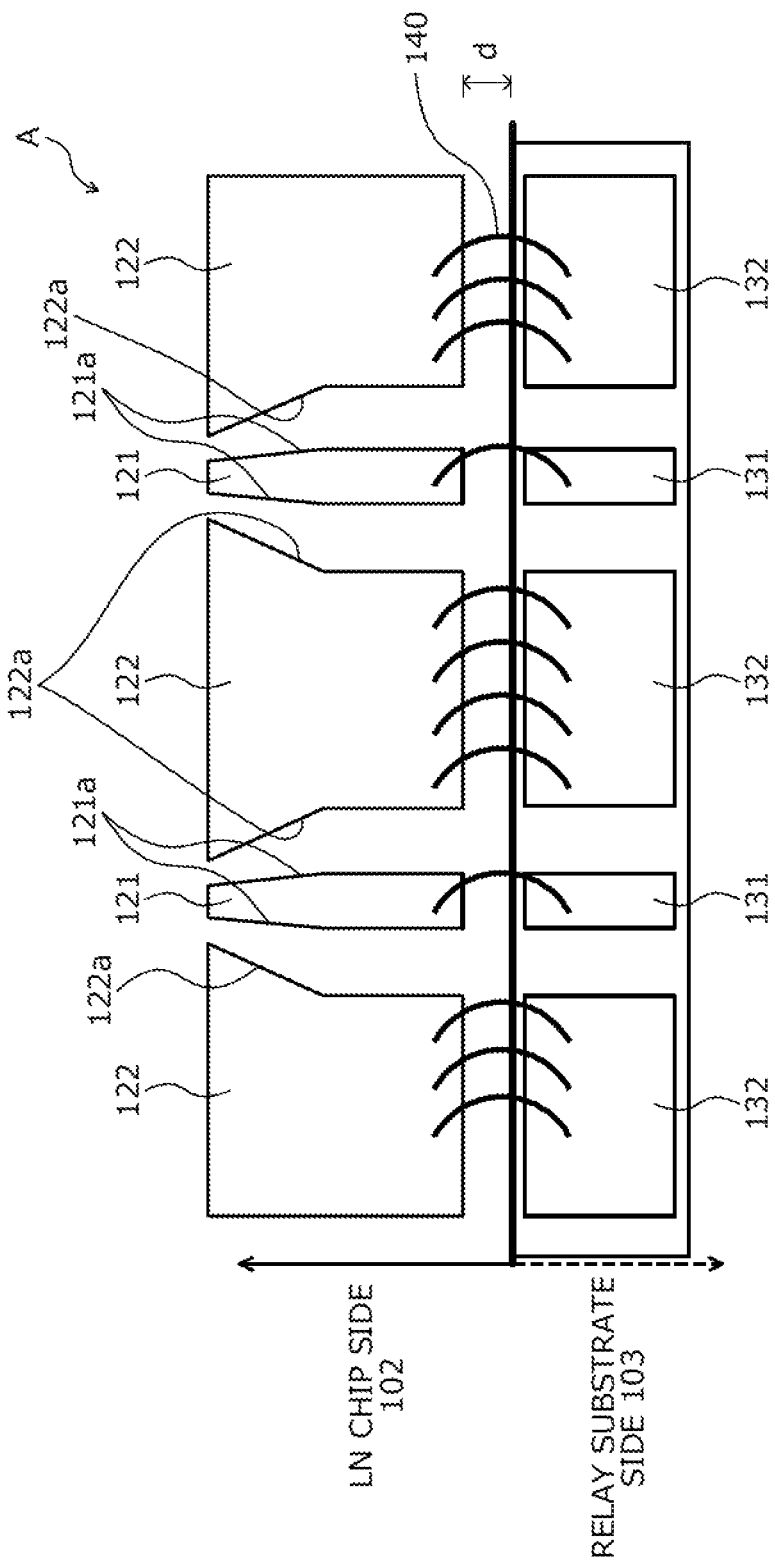
FIG. 2 is an enlarged view of an electrode connection portion of an optical modulator chip and a relay substrate depicted in FIG. 1.

FIG. 2 is an enlarged view of the electrode connection portion of the optical modulator chip and the relay substrate depicted in FIG. 1. FIG. 2 is an enlarged view of the electrode connection portion A of FIG. 1. The signal electrode 121 at the one end of the electrode of the LN chip 102 is formed to have a width in the electrode connection portion A that is large relative to the width in the interacting unit and includes a converting portion (a tapered portion) 121*a* having a large width as depicted. The ground electrodes 122 provided in the portions on both sides of the signal electrode 121 correspond to the tapered portions 121*a* of the signal electrodes 121, and tapered portions 122*a* are formed to maintain constant property impedance (for example, 50Ω).

The tapered portions 121*a* of the signal electrodes 121 are each formed to have a width gradually becoming larger toward the end of the LN chip 102 (the one end of the electrode), and the tapered portions 122*a* of the ground electrodes 122 are each formed to have a width gradually becoming smaller toward the end of the LN chip 102 (the one end of the electrode).

The end of the signal electrode 121 of the LN chip 102 and the signal electrode 131 of the relay substrate 103 are electrically connected to each other through the wire 140 set by wire bonding. The ground electrode 122 of the LN chip 102 is also electrically connected to the ground electrode 132 of the relay substrate 103 through the wires 140.

In the example of FIG. 1, the end of the signal electrode 121 of the LN chip 102 and the signal electrode 131 of the relay substrate 103 are connected to each other by one wire 140, and the end of the ground electrode 122 of the LN chip 102 and the ground electrode 132 of the relay substrate 103 are connected to each other by plural (two or three) wires 140. The number of wires 140 may arbitrarily be varied corresponding to the size of the electrode connection portion A.

High frequency characteristics may be obtained by reducing as much as possible the wire length of each of the wires 140. To do this, it is effective to reduce as much as possible a gap d between (to bring close to each other) the end of the signal electrode 121 of the LN chip 102 and the end of the signal electrode 131 of the relay substrate 103. In this case, it is also effective to reduce as much as possible the same gap d between (to position close to each other) the end of the ground electrode 122 of the LN chip 102 and the end of the ground electrode 132 of the relay substrate 103.

FIGS. 3A and 3B are explanatory plan diagrams of chippings generated in the existing optical modulator chip. FIG. 3A depicts the LN chip 102 portion and does not depict the optical waveguide 111 for convenience. FIG. 3B is an enlarged view of the electrode connection portion A of the LN chip 102 and does not depict the wires 140.

When the LN chip 102 is cut out in the fabrication process, chippings 301 are generated at a certain probability in cut surfaces 102*c* and 102*d* along the length direction of the LN chip 102. The chippings 301 are generated having various lengths L1 and various depths D1 in the side faces of the LN chip 102 and, when the depths D1 are large, the chippings extend over the electrode portions to cause problems such as peeling of the electrodes.

At present, the generation of such chippings 301 cannot be prevented. Therefore, the end 121*b* of the signal electrode 121, and 122*b* are formed at positions to each have a gap (spacing) d equal to or larger than the depth D1 (several ten μm) to be the maximum in the ordinary fabrication process to the cut surface 102*c* of the LN chip 102 such that the chippings 301 do not extend over the electrodes even when the chippings 301 are generated. A width L0 of the end 121b of the signal electrode 121 is, for example, 100 μm.

Due to this, in the electrode connection part A, the LN chip 102 and the relay substrate 103 are separated from each other by the gap d equal to or larger than the depth D1 of the chipping 301. Although it is effective to reduce the distance as much as possible between the electrodes 131 and 132 of the relay substrate 103 and the electrodes 121 and 122 of the LN chip to obtain excellent high frequency characteristics, when the end face of the relay substrate 103 is caused to adhere to the end face (the cut surface 102c) of the LN chip 102, the electrodes are caused to be separated from each other by a distance equal to or larger than the gap d consequent to providing the gap d and frequency characteristics (high frequency characteristics) therefore cannot be improved. In addition, when the spacing is present between the LN chip 102 and the relay substrate 103, the electrodes are further separated from each other and high frequency characteristics therefore degrade.

The inventors focused their attention on the fact that the wire length of each of the wires 140 could be reduced and frequency characteristics could be improved by further reducing the gap (the spacing) of the electrode connection portion A (bringing close to the end face of the LN chip 102). Embodiments of the present invention will be described below.

FIGS. 4A and 4B are plan diagrams of an optical modulator chip according to a first embodiment. FIG. 4A depicts the LN chip 102 overall and FIG. 4B is an enlarged view of the electrode connection portion A. In the first embodiment, the position of the end 121b of the signal electrode 121 is brought close to that of the end (the cut surface 102c) of the LN chip such that the gap between the LN chip 102 and the relay substrate 103 is reduced only for the electrode connection portion A of the LN chip 102 that faces the relay substrate 103.

The gap is set to be "d" between the end 122b of the ground electrode 122 and the end (the cut surface 102c) of the LN chip 102. A gap (spacing) "d1" between the end 121b of the signal electrode 121 and the end (the cut surface 102c) of the LN chip 102 is set to be smaller than the gap d of the ground electrode 122.

The pad (the end 121b) of the signal electrode 121 has the width L0 (for example, 100 μm) and the LN chip 102 has, for example, a length of about 40 mm to about 50 mm and a width of about 1 mm. The width L0 of the pad (the end 121b) of the signal electrode 121 is, for example, 100 μm and the remaining portion is mostly the ground electrode 122.

Observing along the length direction (the cut surface 102c) of the elongated LN chip 102, the ratio that the widths L0 of the ends 121b of the signal electrodes 121 occupy of the electrode connection portion A is several percent of the length of the LN chip 102 depending on the number of the signal electrodes, and this ratio is low.

Even when chippings 301 (see FIGS. 3A and 3B) are generated at the step of cutting the LN chip 102, the probability is low that the chippings 301 are generated at the end 121b of the signal electrode 121 of the electrode connection portion A. The chippings 301 have a predetermined length L1 and are not generated in the overall area along the length direction of the LN chip 102 but rather are generated at random positions.

Consequently, even when only the end 121b of the signal electrode 121 is caused to protrude in the direction of the end (the cut surface 102c) of the LN chip 102, the probability that the chippings 301 will be generated in the electrode connection portion A may be decreased to be extremely low. Even when the electrodes are formed with a small interval equal to or smaller than the gap d with respect to the end 102c of the LN chip 102 and the LN chip 102 is similarly cut based on the existing gap d, the rate of generation of the chippings 301 at the end 121b portion of the signal electrode 121 is close to zero.

FIG. 5 is an enlarged view of FIG. 4A and is a diagram depicting a state of the wire connection. FIG. 5 depicts a state in which the end face (the cut surface 102c) along the length direction of the LN chip 102 and the end 103c of the relay substrate 103 are brought close to each other. The end 131b of the signal electrode 131 of the relay substrate 103 and the end 132b of the ground electrode 132 are each provided inward by a predetermined width from the end face (the cut surface) 103c.

As described, the end 121b of the signal electrode 121 of the LN chip 102 may be brought close to the signal electrode 131 of the relay substrate 103 whereby connection may be established using a wire 140a having a short wire length between the end 121b of the signal electrode 121 of the LN chip 102 and the signal electrode 131 of the relay substrate 103, and the frequency property may be improved.

In the example depicted in FIG. 5, the LN chip 102 and the relay substrate 103 are arranged adhered to each other. Without limitation hereto, high frequency characteristics may also be improved even in the case of a structure in which the distance between the end 102c of the LN chip 102 and the end 103c of the relay substrate 103 is several μm to several ten μm taking into consideration the difference in the linear expansion coefficient between the respective materials.

FIGS. 6A, 6B, 6C, 6D, 6E, 6F are cross-sectional diagrams of an example of fabrication steps of the optical modulator chip according to the first embodiment. FIGS. 6A, 6B, 6C, 6D, 6E, 6F depict enlarged views of cross-sections of a portion of the LN chip 102 in the wafer process and the dicing.

Figure 6A:
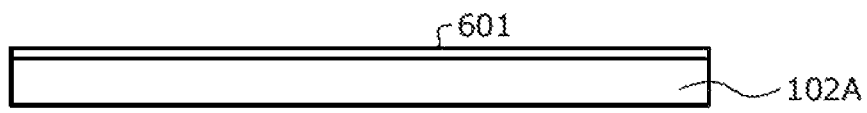
FIGS. 6A, 6B, 6C, 6D, 6E, 6F are cross-sectional diagrams of an example of fabrication steps of the optical modulator chip according to the first embodiment.
Figure 6B:
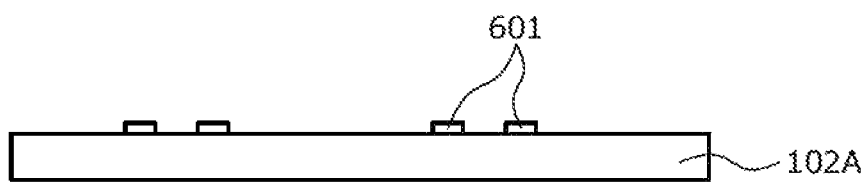
Figure 6C:
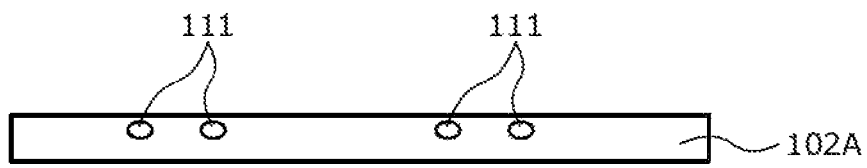

As depicted in FIG. 6A, a film is first formed by vapor deposition of titanium (Ti) 601 on an LN substrate (wafer) 102A. As depicted in FIG. 6B, patterning by photolithography or the like is executed thereafter so that the portion having the optical waveguide 111 formed therein remains. As depicted in FIG. 6C, Ti is thereafter diffused to fabricate the optical waveguide 111 in the LN substrate (the wafer) 102A.

Figure 6D:
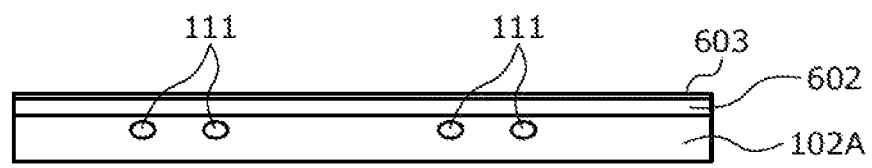

As depicted in FIG. 6D, a buffer layer 602 and a silicon (Si) coating film 603 are formed thereafter each as a film on the LN substrate (the wafer) 102A by electron beam (EB) vapor deposition or sputtering.

Figure 6E:
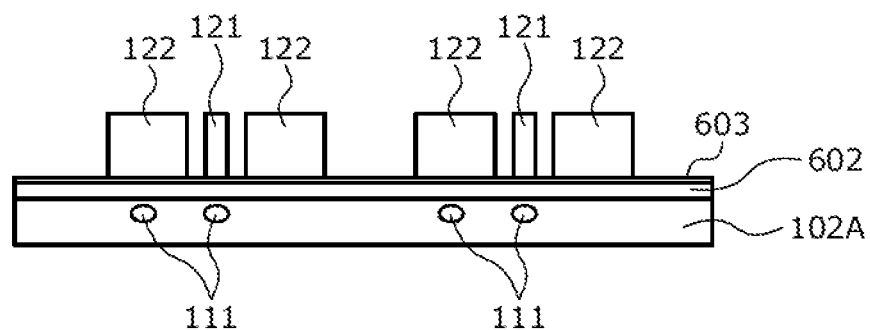

As depicted in FIG. 6E, the electrodes (the signal electrode 121 and the ground electrode 122) are formed by executing gold (Au)-plating. The process steps up to the formation of the electrodes are executed for each one wafer as a unit.

Figure 6F:
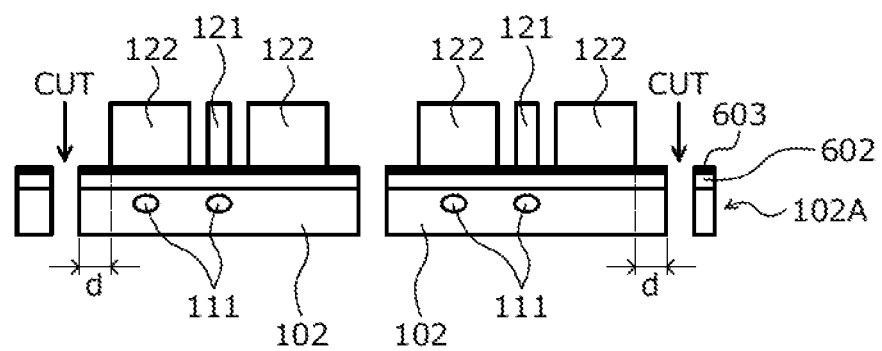

As depicted in FIG. 6F, the LN substrate (the wafer) 102A is thereafter cut using a dicing saw or the like into chips each as the LN chip 102. At this step, as described, the chippings 301 and the like are generated at the end face (such as 102c) of the LN chip 102.

Consequently, for the end face (the cut surface) 102c of the LN chip 102, the cutting is executed at a position away from the electrode by the predetermined gap d (several ten μm). FIG. 6F depicts the positions for cutting for the ground electrodes 122. The positions for cutting in the first embodiment (FIGS. 4A and 4B) are the same positions as the positions for existing (currently executed) cutting (FIGS. 3A and 3B).

In the first embodiment, the formation of the electrodes (the signal electrode 121 and the ground electrode 122) are coped with by the mask design and the cutting is therefore executed after the completion of the formation of the electrodes (the signal electrode 121 and the ground electrode 122) without any change relative to the existing electrode formation process. At the step of dicing itself, the cutting is also executed using a dicing saw or the like in a process similar to that of the existing technique.

In this manner, all the steps relating to the formation of the LN chip 102 can be executed using the cutting step based on the existing techniques and the gap d similar to the existing one as they are, and the LN chip 102 of the first embodiment can therefore be easily formed. In this case, any precision improvement is also not necessary for the precision of the positions for the cutting and the like.

Figure 7A:
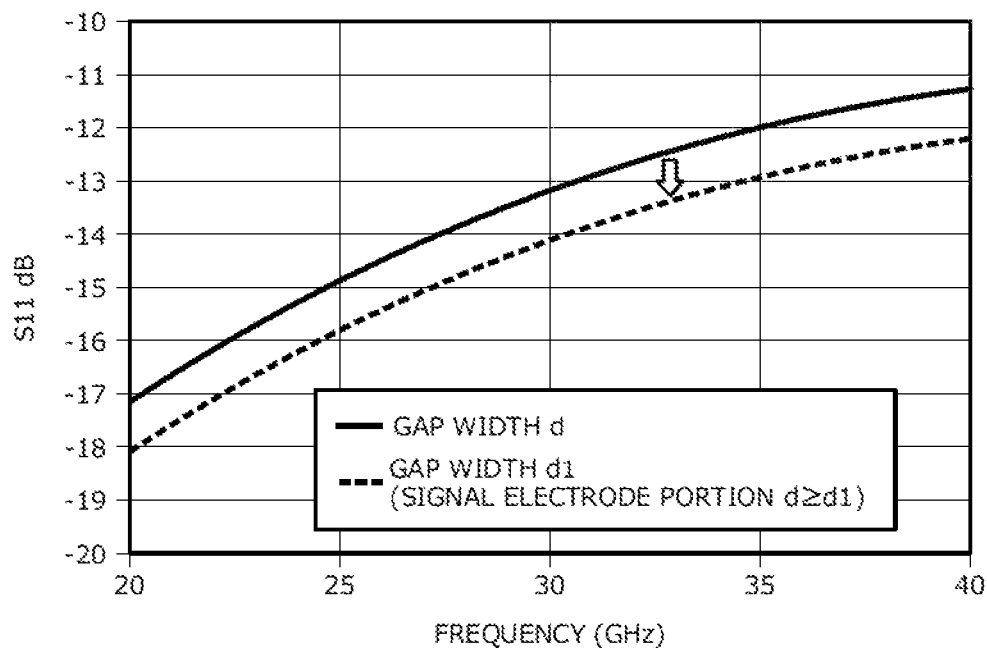
FIG. 7A is a chart of characteristics of the optical modulator chip according to the first embodiment.
Figure 7B:
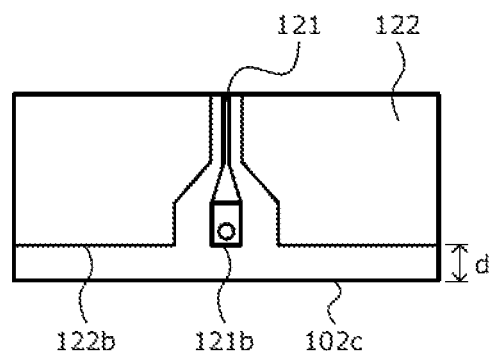
FIGS. 7B and 7C are diagrams of examples of LN chips.
Figure 7C:
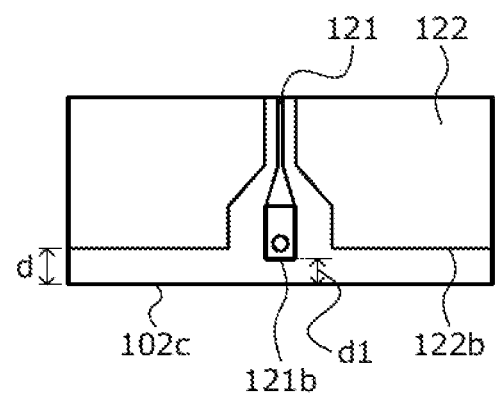

FIG. 7A is a chart of characteristics of the optical modulator chip according to the first embodiment. FIGS. 7B and 7C are diagrams of examples of LN chips. FIG. 7A depicts the result of simulation of S11 (the reflection property). The vertical therein represents S11 (the reflection property [dB]) and the horizontal therein represents the frequency [GHz].

FIG. 7B depicts an example of a current ordinary LN chip, i.e., a case in which the gap is d between the end 102c of the LN chip 102 and the ends of the electrodes (the end 121b of the signal electrode 121 and the end 122b of the ground electrode 122) depicted in FIGS. 3A and 3B and the like.

FIG. 7C depicts an example of the LN chip 102 according to the first embodiment, i.e., a case in which the gap is d between the end 102c of the LN chip 102 and the end 122b of the ground electrode 122, and the gap is d1 between the end 102c of the LN chip 102 and the end 121b of the signal electrode 121 depicted in FIGS. 4A, 4B and the like.

As depicted in FIG. 7A, according to the first embodiment, the reflection property is improved compared to that of the existing configuration in the overall region of the high frequency band. This is because the interval is reduced between the signal electrodes 121 and 131 between the relay substrate 103 and the LN chip 102, and the wire length of each of the wires 140a that are provided between the signal electrodes 121 and 131 is therefore short.

According to the first embodiment, the length of each of the wires that connect the signal electrodes between the LN chip and the relay substrate may be shortened by forming among the electrodes on the LN chip, the signal electrodes connected to the relay substrate so that the ends are positioned close to the end face of the LN chip. The frequency property may thereby be improved. Thus, an LN chip may be provided that has improved frequency characteristics by a simple step without degrading the fabrication yield of the LN chip because the probability is extremely low that chipping generated at the step of cutting the LN chip will be generated at the portions of the signal electrodes each having a small width.

Figure 8A:
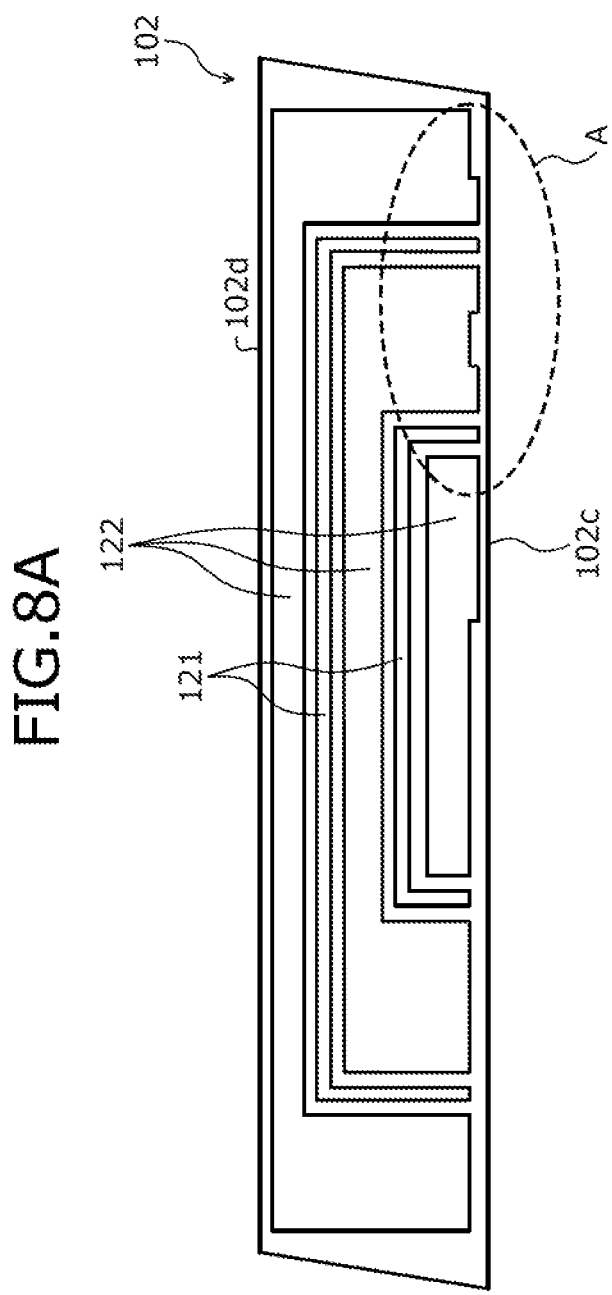
FIGS. 8A and 8B are plan diagrams of an optical modulator chip according to a second embodiment.
Figure 8B:
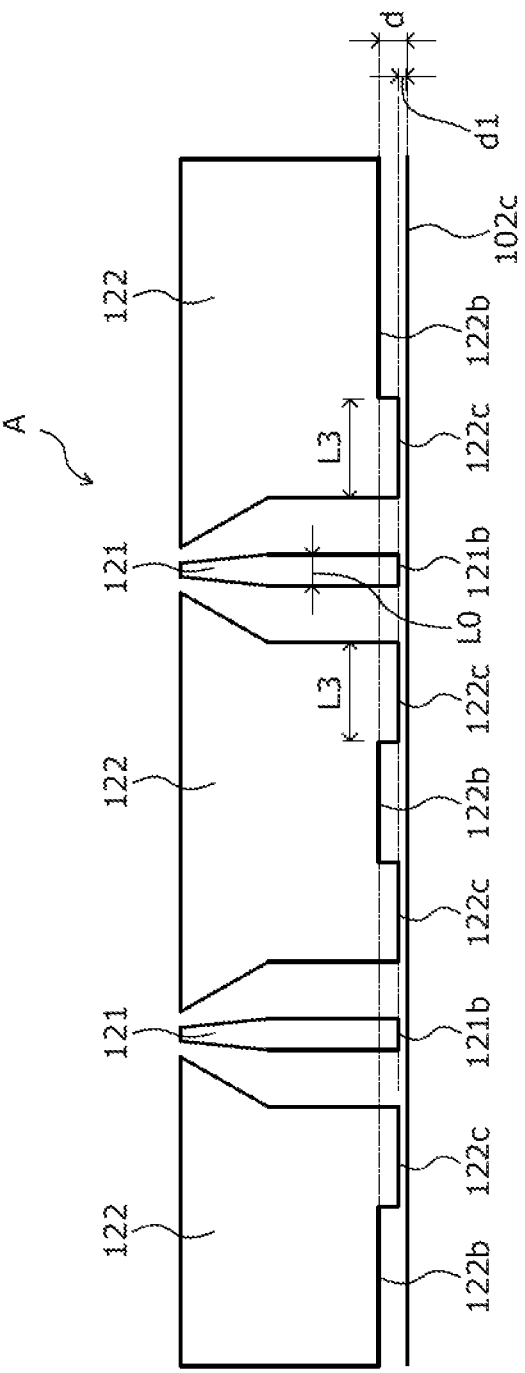

FIGS. 8A and 8B are plan diagrams of an optical modulator chip according to a second embodiment. FIG. 8A depicts the LN chip 102 overall and FIG. 8B is an enlarged view of the electrode connection portion A. In the second embodiment, concerning the electrode connection portion A of the LN chip 102 that faces the relay substrate 103, similar to the first embodiment, the end 121b of the signal electrode 121 is brought close to the end (the cut surface 102c) of the LN chip 102 such that the gap between the relay substrate 103 and the LN chip 102 is reduced.

In the second embodiment, some of the ends 122b of the ground electrodes 122 are brought close to the end (the cut surface 102c) of the LN chip 102.

A portion of the ground electrode 122 (a predetermined length L3 portion) positioned in the electrode connection portion A and adjacent to the signal electrode 121, includes an end (a first tip) 122c that is brought close to the end (the cut surface 102c) of the LN chip 102. The gap (the spacing) is d1 between the end (the first tip) 122c and the end (the cut surface 102c) of the LN chip 102.

A portion of the ground electrode 122 of the LN chip 102 (the portion other than the predetermined length L3 of the first tip 122c) away from the signal electrode 121, includes the end (a second tip) 122b of the gap d (d>d1) between the portion and the end (the cut surface 102c) of the LN chip 102. The second tip 122b has the gap d similar to that of the first embodiment to the end (the cut surface 102c) of the LN chip 102. In the planar view, the first end 122c is formed including a step that protrudes more toward the end (the cut surface 102c) of the LN chip 102 than the second tip 122b.

As described, the end 121b of the signal electrode 121 positioned in the electrode connection portion A and the portion of the end 122c of the ground electrode 122 (the portion adjacent to the signal electrode 121) are brought close to the end (The cut surface 102c) of the LN chip 102 to have the gap d1 therebetween. In this case, between the LN chip 102 and the relay substrate 103, in addition to the signal electrode 121, the ground electrode 122 as well as may be connected by the plural short wires 140. Configuration may be such that the gap d1 retained by the end 121b of the signal electrode 121 and that retained by the end 122c of the ground electrode 122 are not be equal to each other.

In FIGS. 8A and 8B, the electrode connection portion A is depicted being enlarged (enlarged in length) compared to the length of the overall LN chip 102 and the length of the electrode connection portion A along the length direction is several hundred μm. Consequently, even when the end 122c of the ground electrode 122 is brought close to the end (the cut surface 102c) of the LN chip 102 with the gap d1 present therebetween, the rate of generation of the chippings 301 at the end 122c of the ground electrode 122 when the cutting is executed is still low.

As described, according to the second embodiment, concerning the electrode connection portion, not only the signal electrode but also the ground electrode may be connected each using a wire having a short length. Production of ripples and the like, and fine adjustment (matching) of the property impedance may thereby be easily executed and the frequency band may further be improved.

FIGS. 9A and 9B are plan diagrams of the optical modulator chip according to a third embodiment. FIG. 9A depicts the overall LN chip 102 and FIG. 9B is an enlarged view of the electrode connection portion A. In the third embodiment, for the electrode connection portion A of the LN chip 102, similar to the above embodiments, the end 121b of the signal electrode 121 is brought close to the end (the cut surface 102c) of the LN chip 102 such that the gap is reduced between the relay substrate 103 and the LN chip 102.

In the third embodiment, the end 122c is provided that is formed by bringing a portion of the ground electrode 122 to be close to the end (the cut surface 102c) of the LN chip 102 with the gap d1 present therebetween.

As depicted in FIG. 9B, the gap is set to be d between the end 122c of the ground electrode 122 and the end (the cut surface 102c) of the LN chip 102. Of the ground electrode 122, the end 122c having a predetermined length L3 brought close to the end (the cut surface 102c) of the LN chip 102 is provided in the portion positioned in the electrode connection portion A. The gap (the spacing) is set to be d1 between the end 122c and the end (the cut surface 102c) of the LN chip 102.

Of the portion of the ground electrode 122 positioned in the electrode connection portion A, a broad portion (an inclining portion) 122d for which the interval of the gap continuously varies from that at the position of the end 122c (the gap d1) to that at the position of the gap d is provided in an area other than the end 122c.

The broad portion 122d of the ground electrode 122 has a shape whose portion in proximity to the signal electrode 121 portion (the end 122c) is positioned closest to the end (the cut surface 102c) of the LN chip 102 to have a small gap. The shape of the ground electrode 122 at a position more distant from the signal electrode 121 along the length direction of the LN chip 102 is such that the ground electrode 122 is more distant from the end (the cut surface 102c) of the LN chip 102 due to the broad portion 122d (the gap becomes larger).

As described, the end 121b of the signal electrode 121 positioned in the electrode connection portion A and the portion of the end 122c of the ground electrode 122 (the point in proximity to the signal electrode 121) are brought close to the end (the cut surface 102c) of the LN chip 102. In this case, between the LN chip 102 and the relay substrate 103, in addition to the signal electrode 121 the ground electrode 122 may also be connected by the plural short wires 140.

In the broad portion 122d, the gap continuously varies therein however the shape thereof is not limited hereto and the broad portion 122d may be configured to have plural different gaps and the gaps may be varied stepwise.

Consequently, in the third embodiment, concerning the electrode connection portion, not only the signal electrode but also the ground electrode may also be connected using wires each having a short length. The occurrence of ripples and the like, and fine adjustment (matching) of the property impedance may thereby be easily performed and the frequency band may further be improved.

In addition, in the third embodiment, the occurrence of ripples and the like, and fine adjustment of the property impedance (matching) may be executed more easily than those of the second embodiment and the frequency band may be improved further by providing the broad portion in the ground electrode in the electrode connection portion.

FIGS. 10A and 10B are plan diagrams of the optical modulator chip according to a fourth embodiment. FIG. 10A depicts the LN chip 102 overall and FIG. 10B is an enlarged view of the electrode connection portion A.

In the fourth embodiment, the structure of the electrode connection portion (a first electrode connection portion) A on the input side for the electrical signal to the electrode is also applied to the output side of the electrode, i.e., the portion (a second electrode connection portion B) that is connected to the terminating resistor and the like. The electrode connection portions A and B are both provided on the same end (the cut surface 102c) of the LN chip 102.

As described, for the electrode connection portion A, any one of the various aspects of the first to the third embodiments (FIGS. 4A and 4B, FIGS. 8A and 8B, and FIGS. 9A and 9B) may be employed. For the electrode connection portion B, any one of the various aspects of the first to the third embodiments (FIGS. 4A and 4B, FIGS. 8A and 8B, and FIGS. 9A and 9B) may also be employed. FIGS. 10A and 10B depict an example where the structure described in the first embodiment (FIGS. 4A and 4B) is applied to each of the electrode connection portions A and B.

According to the fourth embodiment, the effects described in the above embodiments may be achieved and, for both the input side and the output side for the electrical signal to/from the LN chip, the high frequency characteristics and ripples of the terminating portion may be reduced further by bringing the end of each of the signal electrode and the ground electrode to be in proximity to the end face (the cut surface) of the LN chip.

Figure 11C:
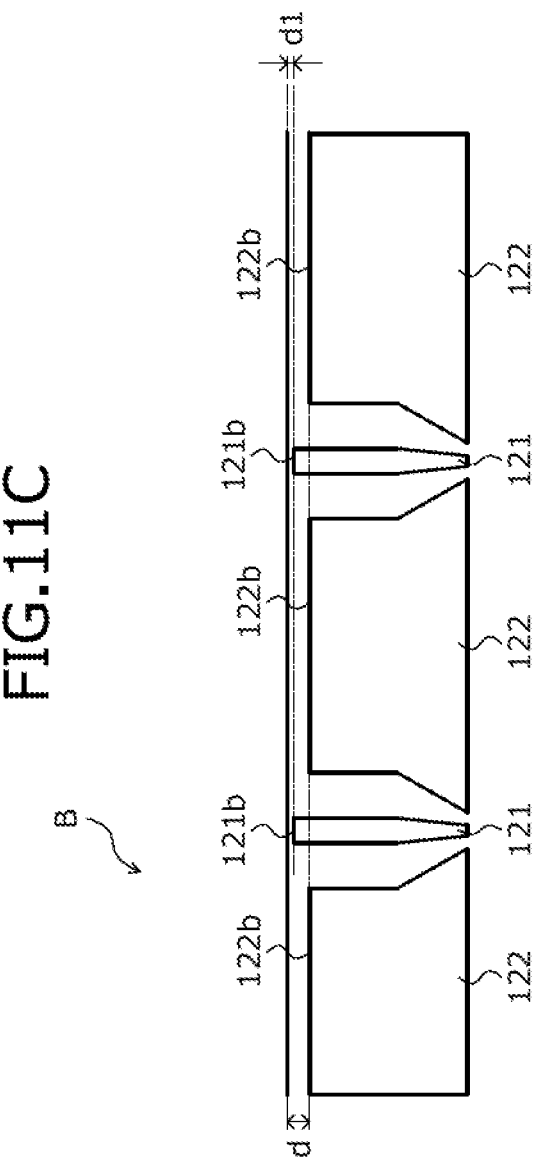

FIGS. 11A, 11B, and 11C are plan diagrams of an optical modulator chip according to a fifth embodiment. FIG. 11A depicts the LN chip 102 overall; FIG. 11B is an enlarged view of the electrode connection portion A; and FIG. 11C is an enlarged view of the electrode connection portion B.

In the fifth embodiment, application is made to an example where the output side of the electrodes, i.e., the portion connected to the terminating resistor and the like (the electrode connection portion B) is formed on the opposite face of the LN chip 102 to the electrode connection portion A on the input side for the electrical signals to the electrodes. The electrode connection portions A and B are provided on ends (the cut surfaces 102c and 102d) of the faces opposite to each other of the LN chip 102.

Similar to the fourth embodiment, for the electrode connection portions A and B, any one of the various aspects of the first to the third embodiments (FIGS. 4A and 4B, FIGS. 8A and 8B, and FIGS. 9A and 9B) may be employed. FIGS. 11A, 11B, and 11C depict an example where the structure described in the first embodiment (FIGS. 4A and 4B) is applied to each of the electrode connection portions A and B.

According to the fifth embodiment, the effects described in the above embodiments may be achieved and, the same actions and effects may also be achieved even when the input side and the output side for electrical signals into/from the LN chip are formed on the faces opposite to each other of the LN chip. The high frequency characteristics and the ripples in the terminating portion may be reduced further by bringing the ends of the electrodes (the signal electrode and the ground electrode) provided on the opposite faces of the LN chip 102 to be in proximity to the end faces (the cut surfaces) of the LN chip.

According to the embodiments, the length of each of the wires connecting the LN chip and the signal electrodes of the relay substrate to each other may be reduced by forming among the electrodes on the LN chip, the end of at least the signal electrode positioned in the electrode connection portion that connects to the relay substrate, to be positioned close to the end face of the LN chip. The end of the ground electrode may be formed so that the position of the end is brought close to the end face of the LN chip. The portion at the position adjacent to the signal electrode of the end of the signal electrode may be formed in steps bringing the position thereof close to the end face of the LN chip. The portion at the position adjacent to the signal electrode of the end of the signal electrode may be formed bringing the position close to the end face of the LN chip and may be formed such that the position is gradually more distant from the end face of the LN chip as the position is more distant from the signal electrode.

Frequency characteristics may be improved by a simple structure by employing the above configuration. An LN chip may be provided that has frequency characteristics improved by a simple step without degrading the fabrication yield of the LN chip because the probability is extremely law that chipping generated at the step of cutting the LN chip will be generated at the portion of the signal electrode having a small width.

Although the modulator chip has been described taking an example of the LN (LiNbO$_3$) chip in the embodiments, the modulator chip is not limited to the LN chip and the frequency characteristics may also be improved even when the chip is an InP or an Si chip. Although the number of signal electrodes and the number of branches of the optical waveguide are each set to be two, the numbers are not limited hereto and a plural number (for example, four, eight, . . . ) may be employed.

To obtain wideband frequency characteristics, it is effective to reduce as much as possible the length of the wire connecting an electrode on the chip to a relay substrate and, to do this, the electrode on the chip and an electrode on the relay substrate are brought close to each other. A conventional LN chip is fabricated using a semiconductor wafer process or the like and is finally formed as a chip at a step of cutting the semiconductor wafer by dicing or the like while chippings (corresponding to burrs) each having a predetermined length are randomly generated on each of the cut faces (on ends of the electrode portions) at a predetermined probability at the cutting step.

As to chipping, when chipping extends over an electrode (plated) portion on an end of the chip, a problem arises in that the plating is peeled off from the portion and the like. The cutting is therefore executed usually causing the end of the electrode to be distant from the end of the LN chip by a distance equal to or larger than several ten μm such that no chipping extends over the electrode (the plating). Due to this, a gap is formed between the end of the LN chip and the LN electrode, and the formed gap degrades high frequency characteristics to an extent corresponding to the size of the gap.

According to an embodiment, an effect is achieved in that high frequency characteristics may be improved without being affected by chipping.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical modulator comprising:
   an optical modulator chip configured to optically modulate an optical signal using an electrical signal input thereto; and
   a relay substrate configured to relay and couple the electrical signal to the optical modulator chip, wherein
   the optical modulator chip includes a signal electrode and a ground electrode for the electrical signal, formed along a waveguide for the optical signal,
   one end of the optical modulator chip is arranged to face the relay substrate, and an electrode connection portion is configured to couple the electrical signal to the relay substrate using a wire is provided at the one end,
   the ground electrode has:
      a first tip that is adjacent to the signal electrode; and
      a second tip that is distant from the signal electrode, and
      a distance between a tip of one end of the signal electrode positioned in the electrode connection portion and the one end of the optical modulator chip, and a distance between the first tip of one end of the ground electrode and the one end of the optical modulator chip are both less than a distance between the second tip of the one end of the ground electrode and the one end of the optical modulator chip.

2. The optical modulator according to claim 1, comprising a second electrode connection portion in which other ends of the signal electrode and the ground electrode are provided to face the one end of the optical modulator chip, the other ends of the signal electrode and the ground electrode being connected to a terminating portion facing thereto, by wires at the one end of the optical modulator chip.

3. The optical modulator according to claim 1, comprising a second electrode connection portion in which other ends of the signal electrode and the ground electrode are provided to face a second end of the optical modulator chip, the other ends of the signal electrode and the ground electrode being connected to a terminating portion facing thereto using wires at the second end of the optical modulator chip.

4. The optical modulator according to claim 1, wherein a material of a substrate of the optical modulator chip is a ferroelectric.

5. The optical modulator according to claim 1, wherein an end of the optical modulator chip and the relay substrate are adhered to each other or are arranged having a predetermined interval therebetween.

6. An optical module comprising:
   the optical modulator according to claim 1;
   a source of a light beam to be input into the optical waveguide;
   an optical system for the optical signal; and
   a controller configured to control an operation of the optical modulator.

7. An optical modulator comprising:
   an optical modulator chip configured to optically modulate an optical signal using an electrical signal input thereto; and
   a relay substrate configured to relay and couple the electrical signal to the optical modulator chip, wherein
   the optical modulator chip includes a signal electrode and a ground electrode for the electrical signal, formed along a waveguide for the optical signal,
   one end of the optical modulator chip is arranged to face the relay substrate, and an electrode connection portion configured to couple the electrical signal to the relay substrate using a wire is provided at the one end,
   the ground electrode positioned in the electrode connection portion has:
      a first tip that is adjacent to the signal electrode; and
      a broad portion having a distance to the one end of the optical modulator chip becoming larger as the broad portion becomes more distant from the signal electrode, and
   a distance between a tip of one end of the signal electrode positioned in the electrode connection portion and the one end of the optical modulator chip, and a distance between the first tip of one end of the ground electrode and the one end of the optical modulator chip are both less than a distance between the broad portion of the ground electrode and the one end of the optical modulator chip.

8. The optical modulator according to claim 7, comprising a second electrode connection portion in which other ends of the signal electrode and the ground electrode are provided to face the one end of the optical modulator chip, the other ends of the signal electrode and the ground electrode being connected to a terminating portion facing thereto, by wires at the one end of the optical modulator chip.

9. The optical modulator according to claim 7, comprising a second electrode connection portion in which other ends of the signal electrode and the ground electrode are provided to face a second end of the optical modulator chip, the other ends of the signal electrode and the ground electrode being connected to a terminating portion facing thereto using wires at the second end of the optical modulator chip.

10. The optical modulator according to claim 7, wherein a material of a substrate of the optical modulator chip is a ferroelectric.

11. The optical modulator according to claim 7, wherein an end of the optical modulator chip and the relay substrate are adhered to each other or are arranged having a predetermined interval therebetween.

12. An optical module comprising:
the optical modulator according to claim 7;
a source of a light beam to be input into the optical waveguide;
an optical system for the optical signal; and
a controller configured to control an operation of the optical modulator.

* * * * *